United States Patent
Axe et al.

(10) Patent No.: US 7,040,112 B2
(45) Date of Patent: *May 9, 2006

(54) AIR CONDITIONING SYSTEM

(75) Inventors: Richard James Axe, Somerset (GB); Richard Grant Hunt, Somerset (GB)

(73) Assignee: Honewell Normalair-Garrett (Holdings) Limited, Somerset (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/801,620

(22) Filed: Mar. 16, 2004

(65) Prior Publication Data

US 2004/0172963 A1 Sep. 9, 2004

Related U.S. Application Data (63) Continuation of application No. PCT/GB03/01468, filed on Apr. 2, 2003.

(30) Foreign Application Priority Data

| Apr. 8, 2002 | (GB) | ................................ 0208036 |
| Apr. 24, 2002 | (GB) | ................................ 0209322 |
| Aug. 16, 2002 | (GB) | ................................ 0219097 |

(51) Int. Cl.
*F25D 9/00* (2006.01)
*F25B 9/00* (2006.01)

(52) U.S. Cl. .............................. 62/401; 62/86; 62/402
(58) Field of Classification Search ............... 62/401, 62/402, 86, 172
See application file for complete search history.

(56) References Cited

U.S. PATENT DOCUMENTS

| 4,262,495 | A |   | 4/1981 | Gutpa et al. ................. 62/402 |
| 5,461,882 | A |   | 10/1995 | Zywiak ....................... 62/401 |
| 5,555,745 | A | * | 9/1996 | Agahi et al. .................. 62/401 |
| 5,860,283 | A | * | 1/1999 | Coleman et al. ............... 62/87 |
| 5,967,461 | A | * | 10/1999 | Farrington ............... 244/118.5 |
| 6,658,873 | B1 | * | 12/2003 | Clarke et al. ................. 62/172 |
| 6,796,131 | B1 | * | 9/2004 | Sampson ....................... 62/87 |
| 6,883,335 | B1 | * | 4/2005 | Axe et al. ..................... 62/87 |
| 2003/0051492 | A1 |   | 3/2003 | Hartenstein et al. ......... 62/172 |

FOREIGN PATENT DOCUMENTS

| GB |   | 2087540 | A | * | 5/1982 |
| GB |   | 2087540 |   |   | 10/1995 |

* cited by examiner

*Primary Examiner*—William C. Doerrler
(74) *Attorney, Agent, or Firm*—MacMillan, Sobanski & Todd, LLC (57) ABSTRACT

An air conditioning system for an aircraft in which cabin air is recirculated and mixed with cold air from an air conditioning machine which includes at least an expansion turbine over which warm pressurised air is expanded and cooled, and wherein the system includes a heat exchanger in which a heat load from hot cabin air and/or a hot avionics system is exchanged with the warm pressurised air prior to the pressurised air being expanded by the expansion turbine.

10 Claims, 7 Drawing Sheets

FIG. 7

cold air from an air conditioning machine which includes at least an expansion turbine over which warm pressurised air is expanded and cooled, and wherein the system includes a heat exchanger in which a heat load is exchanged with the warm pressurised air prior to the pressurised air being expanded by the expansion turbine, the method including in a first mode of operation, providing a heat load being hot cabin air to the heat exchanger, and in a second mode of operation providing a heat load from a hot avionics system to the heat exchanger.

Thus the invention provides an air conditioning system in which the control of cabin air flow and avionics system heat loads are integrated.

According to a seventh aspect of the invention we provide an air conditioning system for an aircraft in which there is an air conditioning machine for supplying cold air to a cooling circuit which includes a heat load from a hot avionics system, the air conditioning machine including at least an expansion turbine over which warm pressurised air is expanded and cooled, and wherein the cooling circuit includes a heat exchanger in which heat from the heat load is exchanged with the warm pressurised air prior to the pressurised air being expanded by the expansion turbine.

In one arrangement the aircraft includes an unpressurised aircraft cabin, air from the cooling circuit after warming the warm pressurised air in the heat exchanger, being vented from the cooling circuit e.g. to the cabin, or otherwise from the cooling circuit as desired.

BRIEF DESCRIPTION OF THE DRAWINGS

The invention will now be described with reference to the accompanying drawings in which.

DETAILED DESCRIPTION OF THE INVENTION

Figure 1:
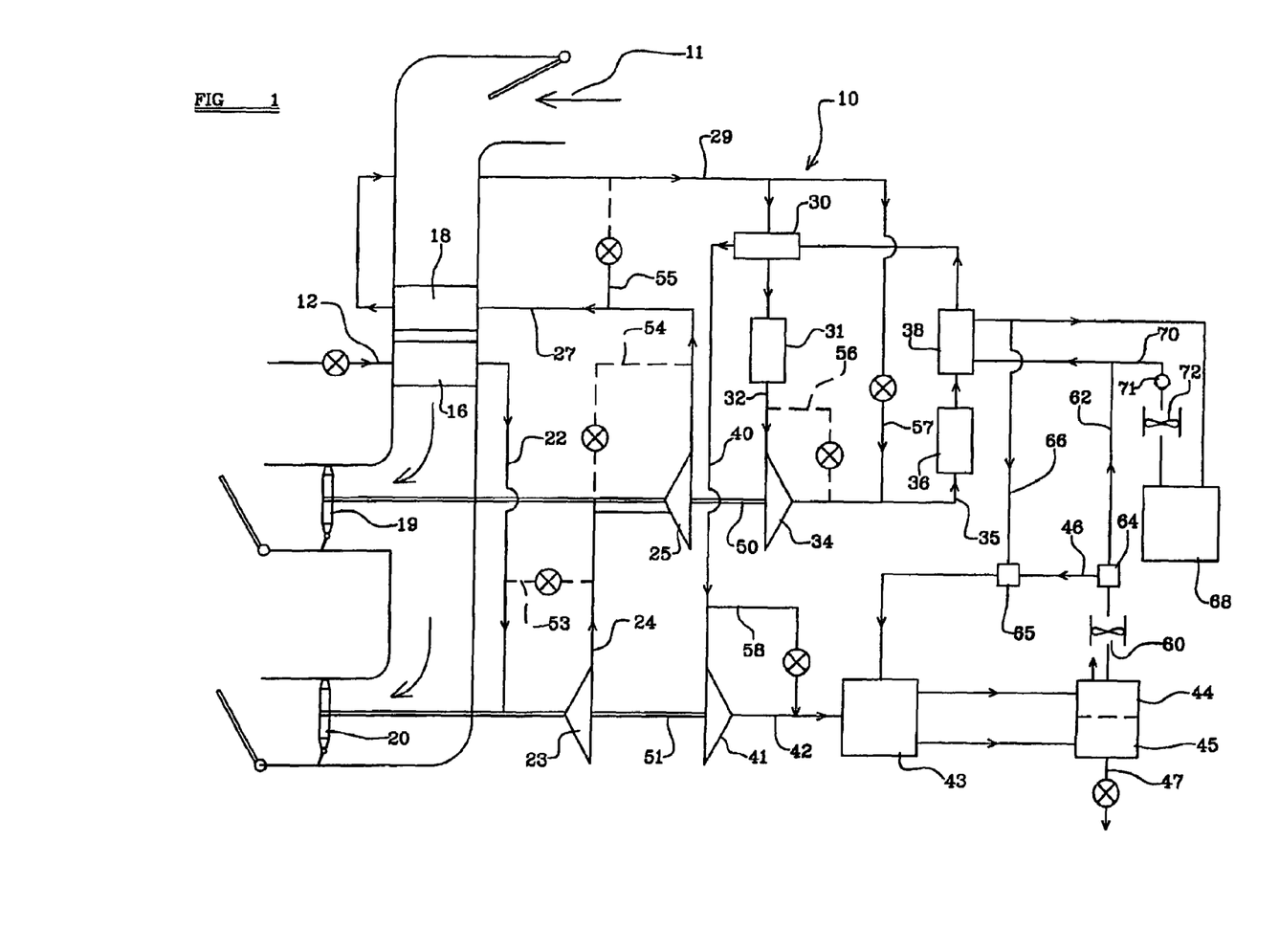
FIG. 1 is an illustrative diagram of an air conditioning system in accordance with the invention.

Referring to FIG. 1 of the drawings, an air conditioning system 10 for an aircraft includes a ram air inlet 11 through which ambient air is introduced to the system when the aircraft is in flight, the ram air generally being driven into the system 10 due to the movement of the aircraft through the air.

The system further includes another air inlet 12 for air bled from the engine. Such bleed air is hotter than the ram air, and is pressurised.

The hotter bleed air from inlet 12 is fed to a primary heat exchanger 16 where heat is exchanged with the cooler ram air from ram air inlet 11. The cooler ram air from ram air inlet 12 is also used to cool hot air in a secondary heat exchanger 18 as hereinafter described. The thus warmed ram air then returns to ambient, with the assistance of fans 19, 20 as hereinafter described.

The fans 19, 20 will assist in drawing in ram air through ram air inlet 12, particularly when the aircraft is on the ground e.g. as the aircraft taxiing.

The air conditioning system 10 includes a two stage compressor/turbine arrangement. In a compressing section of the system 10, the cooled bleed air is first fed from the primary heat exchanger 16 via a duct 22 to a low pressure compressor 23 which thus pressurises and causes heating of the bleed air. From the low pressure compressor 23 the pressurised and heated air is fed along a duct 24 to a high pressure compressor 25 where the air is further pressurised and heated.

The resulting high pressure and hot air is passed to the secondary heat exchanger 18 along a duct 27, and from the secondary heat exchanger 18 the cooled, now warm high pressure air passes along a duct 29 to a cooling section of the system 10. The warm pressurised air is fed from duct 29 to a high pressure water separator 31 via a re-heater heat exchanger indicated at 30, where the warm pressurised air is slightly cooled for a purpose hereinafter explained.

The warm pressurised air is then fed via a duct 32 to a first, high pressure, expansion turbine 34 where the warm pressurised air expands and is cooled. From the high pressure turbine 34, the cooled but still warm lower pressure air is passed along a duct 35 to a medium pressure water separator 36 further to dry the air, and the medium pressure dried air then passes via a load heat exchanger 38 where the air is warmed, and via the re-heater heat exchanger 30 where it is further warmed, via a duct 40 to a second low pressure expansion turbine, where the air is further and substantially cooled and its pressure reduced. The cold air passes from the second expansion turbine 41 via a duct 42 to a mixing box 43 from which air is supplied to an aircraft cabin 44, 45. Two ducts are shown leading from the mixing box to respective parts of the cabin 44, 45, e.g. a main cabin part and the aircraft's flight deck. Air recirculated from the aircraft cabin 44, 45 via a recirculating loop 46 with fan 60 is mixed with the cold air from the duct 42 in the mixing box 43. An outlet for stale air from the cabin 44, 45 to ambient atmosphere is indicated at 47, including a valve for controlling such outlet.

In this example, the low pressure compressor 23 and the second low pressure turbine 41 are carried on a common shaft 51 such that the compressed air expanding across the turbine 41 drives the low pressure compressor 23. Furthermore one (20) of the fans 19, 20 which is effective to eject warmed ram air from the system 10 is also provided on the shaft 51 and is thus driven by the expanding compressed air.

The first high pressure expansion turbine 34 is carried on a shaft 50 on which the high pressure compressor 25 and other fan 19 are carried so that the high pressure compressor 25 and fan 19 are driven by the pressurised air expanding across the first turbine 34.

It can be seen from the drawing that in the compressor section of the system 10 there is a valve controlled by-pass 53 from the duct 22 to the first compressor 23, to the duct 24 between the low pressure compressor 23 and the high pressure compressor 25, and a further valve controlled by-pass 54 from the duct 24 to duct 27 from the high pressure compressor 25, so that the high pressure compressor 25 can be by-passed as permitted by the valve. Also, there is a valve controlled by-pass 55 from the duct 27 to the duct 29 from the secondary heat exchanger 18.

In the cooling section of the system 10 there is a valve controlled by-pass 56 from the duct 32 to the first turbine 34 to the outlet of the turbine 34, a valve controlled by-pass 57 from the duct 29 from the secondary heat exchanger 18 to the outlet duct 35 from the first turbine 34, and a valve controlled by-pass 58 from the duct 40 to the second expansion turbine 41, to the cold air duct 42 from the second expansion turbine 41.

The valves of the by-passes 53, 54, 55, 56, 57, 58 may be operated by a system controller (not shown in FIG. 1) to balance the system 10 in various operating conditions, and to ensure that the cold air entering the mixing box 43 is of a desired temperature and pressure. If desired, the valves in by-passes 53, 54 may be simple check valves.

It will be appreciated that when the aircraft is on the ground particularly in hot climates, the cabin temperature can rise significantly, for example to 55° C. Conventionally upon system start-up such hot cabin air has simply been recirculated until the air is cooled by mixing with cold air in the mixing box 43, to a desired cabin temperature. Thus the heat of the cabin air is lost from the system 10. A proportion of the air in the cabin 44, 45 may be ejected to ambient as indicated through the outlet 47, so that a proportion of the cabin air 44 is refreshed by the air from the air conditioning system 10.

In accordance with the present invention, the system 10 provides a means for recovery of heat energy from hot cabin air.

Cabin air is recirculated from the cabin 44 with fan 60 assistance, and a proportion of the hot cabin air may thus be diverted by a valve 64 via a duct 62 to the load heat exchanger 38 through which the medium pressure air from the first expansion turbine 34 passes. Thus heat from the hot cabin air is used to warm the cooled medium pressure air prior to passing to the second expansion turbine 41.

This is useful because an expansion turbine operates most efficiently at cooling hotter air without losing pressure. Thus the medium pressure cooled air from the first expansion turbine 34 is heated by the hot cabin air in the load heat exchanger 38 so that the second expansion turbine 41 can operate most efficiently at producing cold air for mixing with recirculated cabin air in the mixing box 43. Heat recovered from the load heat exchanger 38 and/or the re-heater 30 can be used by the first turbine 34 to increase its rotating speed, boost its pressure ratio, and increase the expansion of air across the turbine. This provides more cooling for a given mass flow.

It is for the same reason that the re-heater heat exchanger 30 is provided to warm the warm air from the secondary heat exchanger 18, before that air is fed to the first expansion turbine 34.

When the aircraft cabin 44 air has cooled towards a desired temperature, the cabin air may no longer be diverted into duct 62. The amount of cabin air, if any, diverted to duct 62 may be controlled by the valve 64 under the control of the system controller.

However as the aircraft is used, other avionics systems 68 of the aircraft may produce heat. Such systems 68 may be for example navigational or other instrumental systems, hydraulic, electronic or any other system which produces heat. At least some of these systems, especially electronic systems, require cooling.

Whereas conventionally, such heat produced by the avionics system 68 would be lost after cooling, in the present invention, at least some of such heat energy may usefully be used, by feeding a coolant such as air in heat exchange relationship with the avionics system 68 to be cooled, along a duct 70 (including a non-return valve 71) to the load heat exchanger 38. A fan 72 in the duct 70 is operated to regulate the amount of cooling of the avionics system 68, depending upon the system's 68 temperature and whether cabin air is also being fed to the load heat exchanger 38. The return duct from the load heat exchanger 38 has a duct 66 branching off it, to lead to a valve 65 where it joins the recirculating loop 46.

In normal flight when the cabin 44 has been cooled to a desired temperature, this temperature may readily be maintained without diverting cabin air to the load heat exchanger 38 and thus in flight, when the avionics systems 68 are creating the most heat, the load heat exchanger 38 may recover that heat energy as described.

Various modifications may be made without departing from the scope of the invention. Particularly the system 10 described and shown in the drawings includes a low pressure air conditioning machine provided by the shaft 51 and the first compressor 23 and second expansion turbine 41 and a high pressure air conditioning machine provided by the shaft 50, the second compressor 25 and the first expansion turbine 34, each machine including on a common shaft 51, 51 a respective fan 20, 19. In another arrangement, only one fan 19, 20 may be provided, and the compressors 23, 25 and expansion turbines 34, 41 may be provided otherwise than on respective common shafts 50, 51, or the compressors 23, 25 and expansion turbines 34, 41 may all be provided on a single shaft.

Although the re-heater heat exchanger 30 is preferably provided, this is not essential, as is illustrated by the embodiment described with reference to FIG. 5 below.

A proportion of the cabin 44 air may be disposed of to allow for air refreshment otherwise than as described through outlet 47.

As described above, either the hot cabin air is diverted to the load heat exchanger 38 when the cabin air is above a desired or predetermined temperature range, in a first operating mode, or the heat load from the hot avionics system 68 is provided to the load heat exchanger 38 in a second operating mode. If desired, heat load from the cabin air and avionics system 68 may be provided to the load heat exchanger 38 during a transition phase before the cabin air has been cooled to below the predetermined temperature range and whilst the avionics system 68 is hotter than another predetermined temperature.

The valves 64, 65 shown in the system above may be modulating valves of suitable type, and may be controlled in respect of their operation to operate in a predetermined relationship to one another.

If desired, additional cooling for the cabin 44, 45 air and/or the avionics system(s) 68 may be provided so that only a proportion of the cabin air/avionics system(s) heat is used to heat the warm pressurised air in the load heat exchanger 38.

Figure 2:
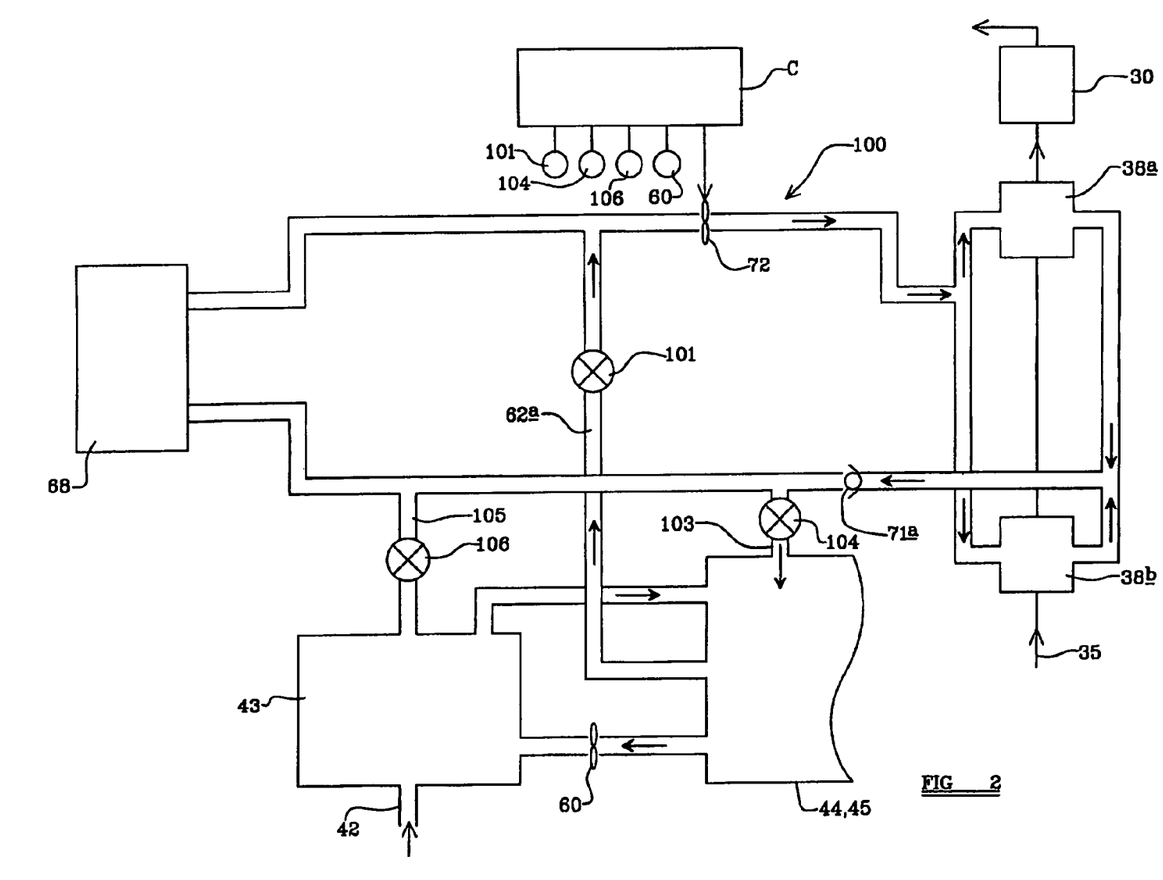
FIG. 2 is an illustrative diagram of part of the system shown in FIG. 1 but modified and operating in a first operational mode.
Figure 3:
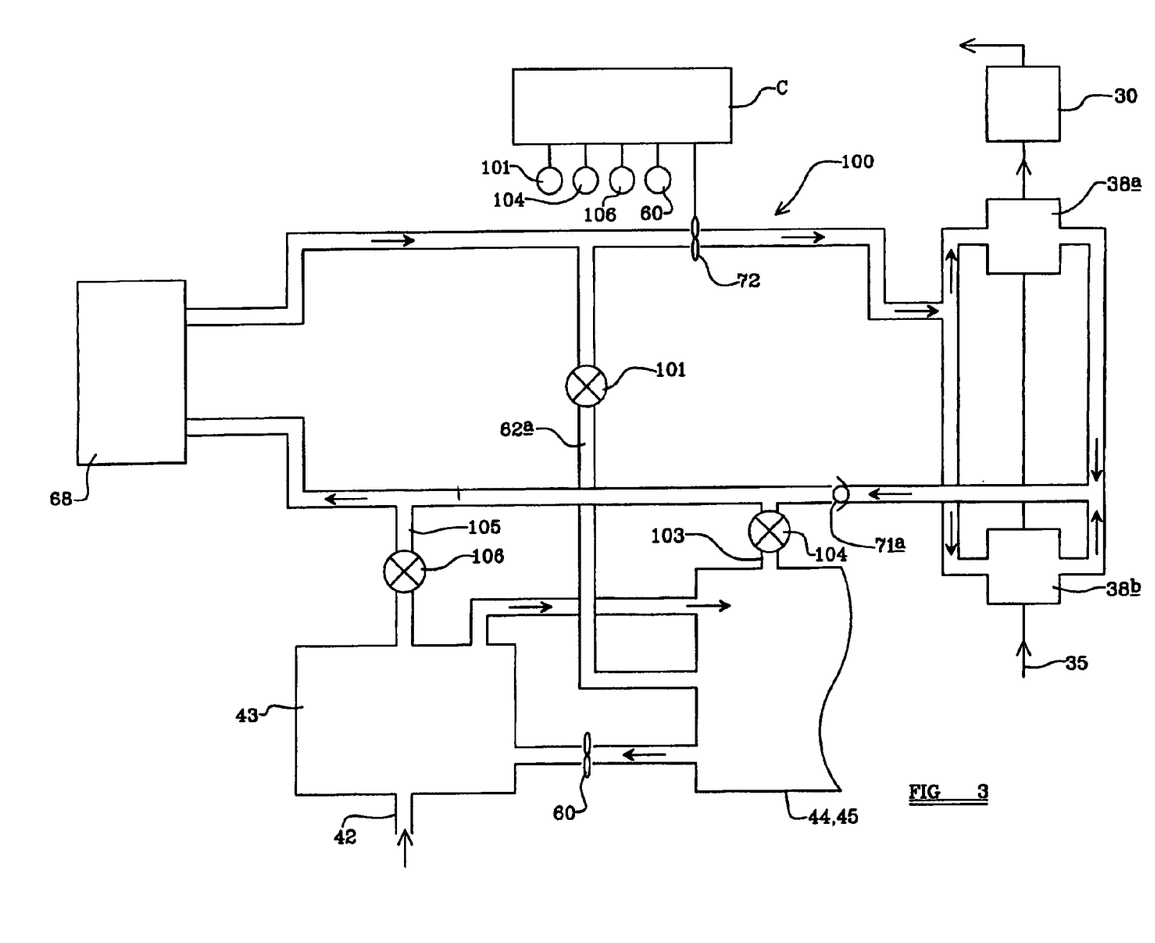
FIG. 3 is an illustrative diagram of part of the system shown in FIG. 2 but operating in a second operational mode.

Referring to FIGS. 2 and 3 a part of the air conditioning system of FIG. 1 is shown, but the system is modified. However similar components are labelled with the same reference numerals as in FIG. 1 for ease of understanding.

In FIG. 2, the system 10 is operated in a first operational mode, with the aircraft usually on the ground, whilst in FIG. 3, the system 10 is operating in a second operational mode, with the aircraft in flight.

Referring to FIG. 2, the diverter valve 64 which diverts a proportion of the cabin 44, 45 air to the duct 62 to the load heat exchanger 38, and the valve 65 which permits cooled diverted air to be returned to the mixing box 43, are dispensed with. Also, instead of a single stage heat load exchanger 38, a dual stage load heat exchanger 38*a*, 38*b* is provided, through which pressurised warm air from duct 35 is provided, and from which the further warmed air is fed via a further heat exchanger 30, to the expansion turbine 41 as indicated in FIG. 1.

Instead of the diverter and return valves 64, 65, a duct 62a is provided from the cabin 44, 45 into a cooling circuit 100 in which the dual stage heat load exchanger 38a, 38b is provided. A valve 101 in the duct 62a, which is open in this mode of operation, may be opened or closed under the control of the system controller C.

Cabin air which is cooled in the cooling circuit 100 by the dual stage load heat exchanger 38a, 38b may be returned to the cabin 44, 45 via an inlet duct 103, there being a valve 104, in the inlet duct 103 controlled by the system controller C to be open in this mode of operation.

It will be appreciated that the valves 101 and 104 may be simple on/off valves but preferably are modulating or proportional valves, so that the proportion of cabin air provided to the cooling circuit 100 may be adjusted depending on the temperature of the cabin air or other system 10 criteria.

Also, the fan 60 which is provided to withdraw hot air from the cabin 44, 45 and provide the air to the mixing box 43 for mixing with cold air from the expansion turbine 41 may be controlled by the system controller C to provide a desired rate of air extraction for the parameters of the system 10.

It can be seen that there is provided no isolating valve or the like to prevent the flow of air to and from the avionics system 68 in this example, but any such air flow will have little effect on the efficiency of the system 10 for rapidly cooling the cabin 44, 45 air, as the heat load of the avionics system 68, e.g. produced by one or more avionics systems of the aircraft will be small upon initial start up. The positioning of the non-return valve 71a in the cooling circuit in the flow from the dual stage load heat exchanger 38a, 38b will help ensure that any air flow to the avionics system 68 will follow the general direction of air flow in the cooling circuit 100.

The fan 72 which is provided to facilitate air flow around the cooling circuit is controlled by the system controller C.

There is also provided from the mixing box 43, a duct 105 in which there is a control valve 106, the duct 105 extending to the cooling circuit 100. In the first mode of operation indicated in FIG. 2, the valve 106 is closed and thus all air flow from the mixing box 43 is to the cabin 44, 45.

Referring now to FIG. 3 the modified system 10 of FIG. 2 is shown operating in a second operational mode in which the aircraft will normally be in flight, and the cabin 44, 45 cooled to a desired temperature range. Thus the valves 101, and 104 to and from the cooling circuit 100 have been shut by the system controller C so that the cabin air is maintained within the desired temperature range by mixing the cabin air in the mixing box 43 with cold air from the duct 42 from the expansion turbine 41, with the fan 60 being operated by the system controller C to give an appropriate air flow to the mixing box 43. As with the arrangement of FIG. 1, a proportion of the cabin air would, in both the operational mode shown in FIG. 2 and FIG. 3, need to be removed from the cabin 44, 45 and passed to ambient atmosphere via a valve controlled outlet (not shown in FIGS. 1 and 2 or FIG. 3).

In the operation mode illustrated in FIG. 3, the avionics system or systems 68 is/are producing a heat load which requires cooling. Thus hot air from the heat load of the avionics system(s) 68 is circulated around cooling circuit 100 by the fan 72, through the dual stage load heat exchangers 38a, 38b, where the hot air warms the warm medium-pressurised air prior to such air being fed to the expansion turbine 41.

Again in this second operating mode, valve 106 in the duct 105 from the mixing box 43 to the cooling circuit 100 is closed such that all cold air from the expansion turbine 41 mixed with the cabin air, is fed to the cabin 44, 45.

It will be appreciated that as with the FIG. 1 embodiment, the system 10 modified as illustrated in FIG. 2 and 3 may be operated in a transition phase, with both some cabin air and some hot air from the avionics system(s) 68 being used in the cooling circuit 100 to warm the warm medium pressure air in the heat exchangers 38a, 38b, as controlled to do so by the system controller C.

In the FIGS. 1 to 3 arrangements described, the cabin 44, 45 is either pressurised by virtue of being at ground level or the cabin 44, 45 is pressurised in flight. Thus the air throughout the system 10 is pressurised by the compressor or compressors 23, 25 such that after expansion and cooling across the expansion turbine or turbines 34, 41, the air is still pressurised above low ambient pressure. Thus the air which is introduced into the cabin 44, 45 is pressurised to an adequate extent for breathing for example in the cabin.

Figure 4:
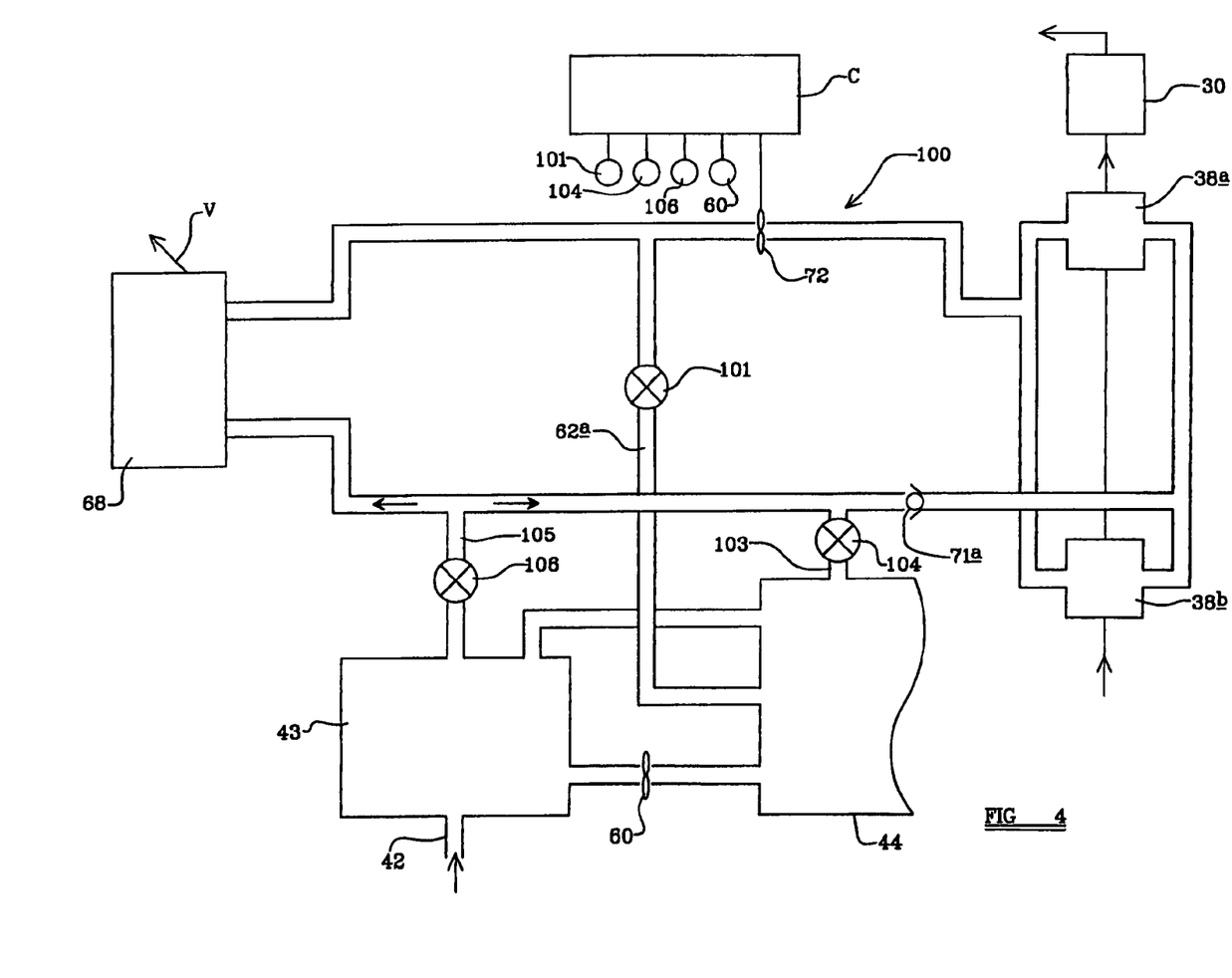
FIG. 4 is an illustrative diagram of part of the system shown in FIGS. 2 and 3 but modified and operating in an alternative second operational mode.

However the system 10 may be operated in an alternative second mode of operation, i.e. with the aircraft in (high altitude) flight. Such operation is illustrated in FIG. 4.

In this arrangement, the cabin 44, 45 is not pressurised or at least is less pressurised than in the previously described operational modes. For example the cabin 44, 45 may be opened to atmosphere and thus may not require cooling.

This may be desirable to permit the ejection of items /parachutists etc. from the cabin 44, 45.

Aircrew and any passengers may at high altitudes require a breathing apparatus, but the cabin 44, 45 will not require cooling.

In such circumstances the system 10 may be operated with the fan 60 inoperative, so that cabin air is not circulated to and from the mixing box 43, and with the valve 106 in the duct 105 between the mixing box 43 and the cooling circuit 100 open, but the valve 101 between the cabin 44, 45 and the cooling circuit 100, closed, as is the valve 104 in the duct 103.

Thus cold air from the mixing box 43 may thus be fed into the cooling circuit 100 directly, and the cold air circulated to cool the avionics system(s) 68.

In this mode of operation, the cooling circuit 100 is open, and the air cooling the avionics heat load 68 is returned to ambient, for example as indicated at V, after heat exchange with the avionics load 68.

At such low pressures, the fan 72 would be unable to operate to move the air efficiently and so the load heat exchangers 38a, 38b will be ineffective as the cold air from the mixing box 43 will flow to the heat load 68 and hence from the cooling circuit.

Various modifications may again be made without departing from the scope of the invention.

For example, the valves 101, 104, 106 may be motorised butterfly valves, but may be other kinds of valves.

Figure 5:
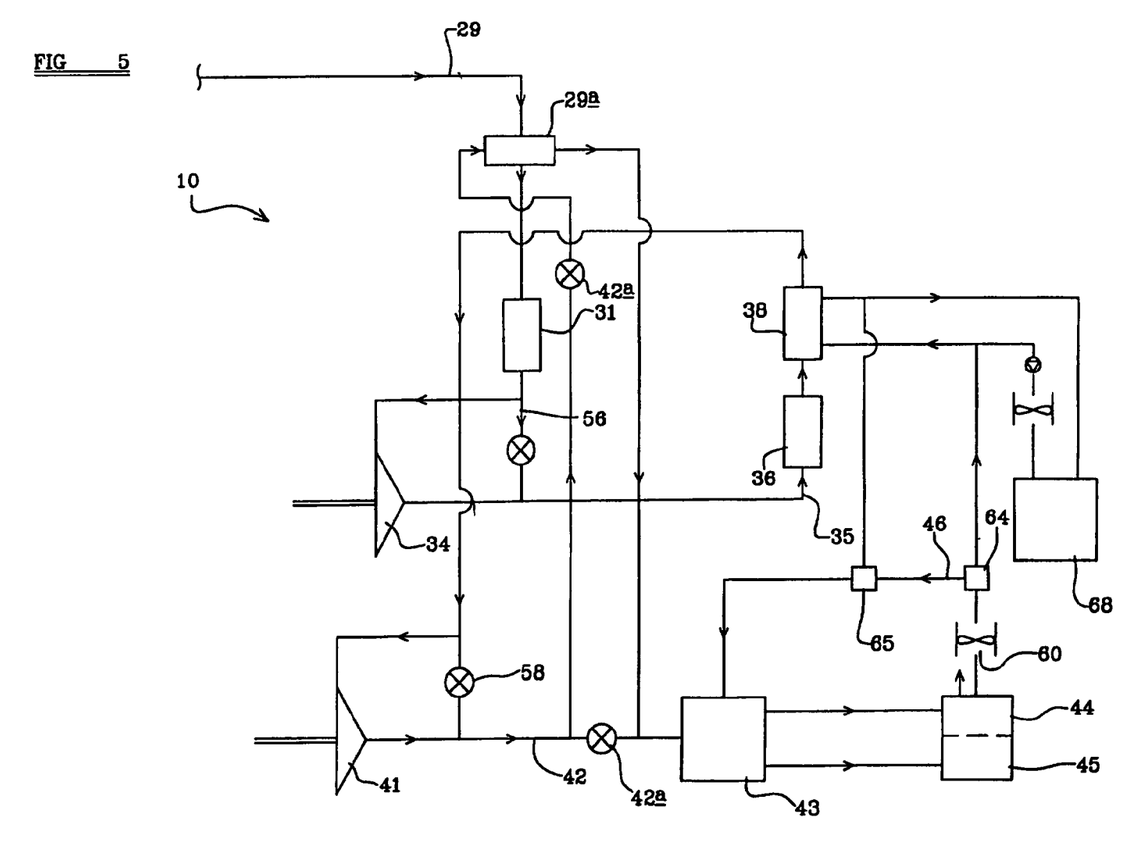
FIG. 5 is an illustrative diagram of part of a system in accordance with the invention alternatively modified and with single stage compression and cooling.

Referring to FIG. 5, a modified system 10 is shown in which there is no reheat heat exchanger as indicted at 30 in FIG. 1. Otherwise similar components to those provided in FIG. 1 are indicated by the same references.

Although there is no reheat heat exchanger (30) a condenser 29a is provided in duct 29 from the compressor 23, 25 to remove water from the compressed air which has been cooled by the ram air in the heat exchanger 18, the condenser 29a receiving cold expanded air from the duct 42 between the low pressure expansion turbine 41 and the mixing box 43 to aid condensation. The slightly warmed air from the condenser 29a is then returned to the duct 42 from where it passes to the mixing box 43. If desired, isolating valves 42a, 42b or modulating valves may be provided to prevent or vary the proportion of cold expanded air passing directly from the expansion turbine 41 to the mixing box 43.

Particularly but not exclusively in the FIG. 5 configuration, the system 10 may be operated without the high pressure compressor 25 and expansion turbine 34 operating, due to for examples only, particular operational requirements, or component failure. To achieve this, the high pressure compressor 25 may be by-passed by opening the valve in by-pass 54, and the valve in by-pass 56.

Alternatively, the system 10 may be operated with the high pressure compressor 25 and expansion turbine 34 operational, but the low pressure compressor 23 and expansion turbine 41 disabled, by opening by-pass valves in ducts 53 and 58.

Figure 6:
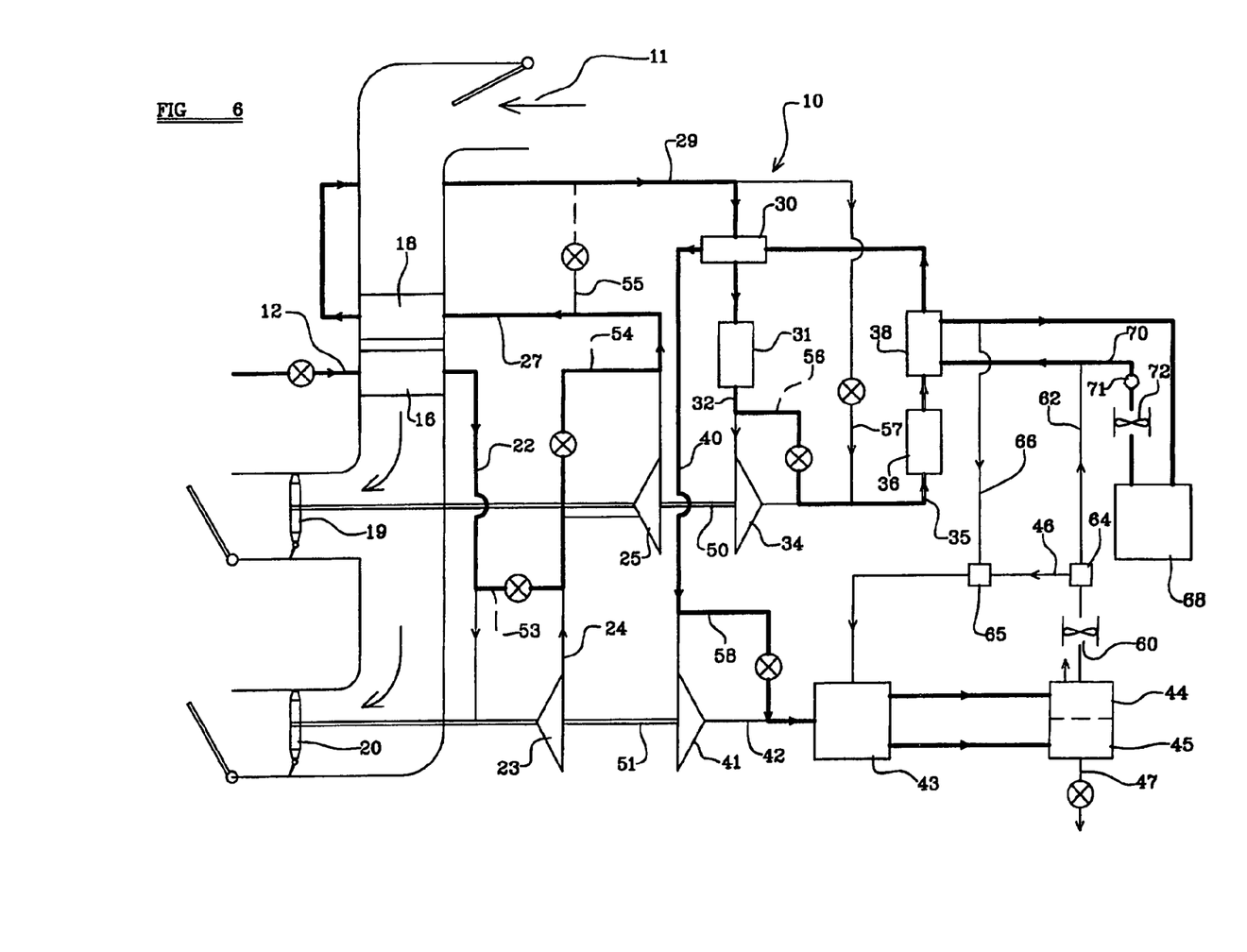
FIG. 6 shows the system of FIG. 1 operating in an alternative mode of operation.

Referring to FIG. 6, the system 10 is shown operating with both the high and low pressure compressors 25, 23 and expansion turbines 41, 34 in operation, due again to particular operational requirements or component failure.

The air path from the bleed air inlet is shown emboldened.

In this mode of operation, the bleed air at inlet 12 is cooled by the ram air in heat exchangers 16 and 18 and is then fed to cabin 44/45, after passing through heat load exchanger 38 where the ram-air-cooled bleed air provides some cooling for the avionics heat load 68.

In all of the embodiments and modes of operation described, the system provides for cooling of the avionics heat load 68 and the cabin 44/45 where this is required, in an integrated system 10.

Figure 7:
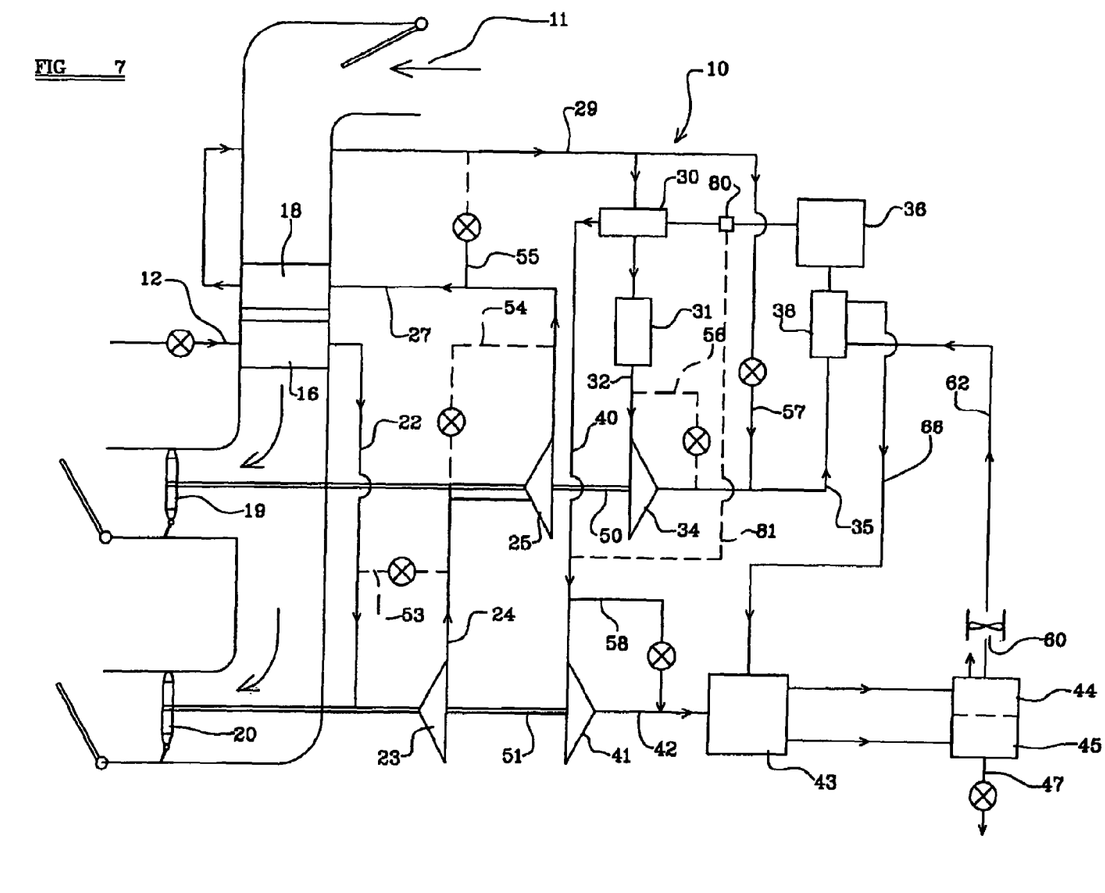
FIG. 7 is an illustrative diagram of a further modification of the system of FIG. 1.

Referring now to FIG. 7 of the drawings, this shows yet a further modification of the air conditioning system shown in FIG. 1. In the system of FIG. 1, waste heat from hot cabin air and waste heat produced by an avionics system can be usefully employed to improve the cooling efficiency of an expansion turbine of an air conditioning machine. Rapid cooling of cabin air, which can become very hot when an aircraft is parked on the ground in hot climatic conditions, is assisted, whilst when the aircraft is in use heat energy which would otherwise be wasted by a conventional avionics cooling system is used to improve the efficiency of the air conditioning machine. However, it has been found that a useful improvement in air conditioning efficiency can be obtained using waste heat from cabin air, without using the heat derived from avionics systems, with some simplification of the overall system in accordance with the invention. In FIG. 7 the same reference numerals are used as are used in relation to FIG. 1, and most of the description relating to FIG. 1 applies also to FIG. 7. FIG. 7 differs from FIG. 1 in that the avionics system 68 is omitted together with the associated duct 70, valve 71 and fan 72. Recirculating duct 46 is omitted, as are valves 64, 65, so that all air recirculated from the cabin with the assistance of fan 60 is passed to the load heat exchanger 38 before recirculating.

FIG. 7 also differs from FIG. 1 in that the medium pressure water separator 36 is disposed downstream of the load heat exchanger 38 instead of upstream thereof. If this modification is made, the effect is that if the air passing to the heat exchanger 38 along duct 35 contains some water, such water will evaporate as a result of heat transfer to the air in heat exchanger 38. Any such evaporation of water in the heat exchanger 38 improves the effectiveness of removal of heat from cabin air by the heat exchanger: the heat exchanger 38 may be able to be made smaller in consequence of this. Any remaining water in the air after the load heat exchanger 38 is removed by the water separator 36 after the heat exchanger.

A further possible modification in a system in accordance with the invention, which is shown in FIG. 7, is that a valve 80 may be provided in the duct between the water separator 36 and the heat exchanger 30, this valve 80 being operable to divert airflow so as to by-pass the heat exchanger 30 by way of a by-pass duct 81. The duct 81 joins the duct 40 upstream of the by-pass 58 of the second expansion turbine 41. If there were to be any failure of the turbine 41 (and hence the loss of the cooling effect of the turbine due to the expansion of air as it passes therethrough) the by-pass 81 enables the return of air to the mixing box 43 and hence to the aircraft cabin without having been warmed by passing through the heat exchanger 30.

The above description of systems in accordance with the invention has been related to the situation where cabin air temperature is required to be reduced as quickly as possible, e.g. when an aircraft has been parked in a hot climate. This is the so-called "pull down" mode of operation. However, the system e.g. as shown in FIG. 7 is also capable of operating in an alternative mode where cabin temperature is required to be "pulled up" from a low starting temperature. This might arise if an aircraft has been parked out of use in a cold climate. In this mode of operation, the ram air entering the ram air inlet 11 is closed off or substantially so, possibly with the fans 19 and/or 20 not operating. Thus bleed air derived from the engine and entering at inlet 12 is not cooled in the heat exchangers 16, 18. Indeed the air reaching the duct 29 may be heated by the compressors 23, 25. Such air passes through the heat exchanger 30 followed by the separator 31, but most of this air is permitted to pass through the by-pass 56 to the duct 35 rather than being expanded and cooled in turbine 34. This air is still relatively warm at its entry to the heat exchanger 38, so that cabin air being recirculated by way of ducts 62, 66 and the heat exchanger 38 is warmed. After the water separator 36, the air from duct 35 is colder than it was when it passed through the heat exchanger 30 from the duct 29, and hence is warmed in the heat exchanger 30 before reaching the duct 40 and the by-pass 58 leading to the mixing box 43.

During operation in this mode, the effect is for the cabin air temperature to be brought up rapidly from a low level.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An air conditioning system for an aircraft in which cabin air is recirculated and mixed with cold air from an air conditioning machine which includes at least an expansion turbine over which warm pressurised air is expanded and cooled, and wherein the system includes a heat exchanger in which a heat load from hot cabin air is exchanged with the warm pressurised air prior to the pressurised air being expanded by the expansion turbine.

2. An air conditioning system for an aircraft in which cabin air is recirculated and mixed with cold air from an air conditioning machine which includes at least an expansion turbine over which warm pressurised air is expanded and cooled, and wherein the system includes a heat exchanger in which a heat load from a hot avionics system is exchanged with the warm pressurised air prior to the pressurised air being expanded by the expansion turbine.

3. An air conditioning system for an aircraft in which cabin air is recirculated and mixed with cold air from an air conditioning machine which includes at least an expansion turbine over which warm pressurised air is expanded and cooled, and wherein the system includes a heat exchanger in which in a first mode of operation a heat load from hot cabin air is exchanged with the warm pressurised air prior to the pressurised air being expanded by the expansion turbine, and in a second mode of operation a heat load from a hot avionics system is exchanged with the warm pressurised air prior to the pressurised air being expanded by the expansion turbine.

4. A method of operating an air conditioning system in an aircraft of the kind in which cabin air is recirculated and mixed with cold air from an air conditioning machine which includes at least an expansion turbine over which warm pressurised air is expanded and cooled, and wherein the system includes a heat exchanger in which a heat load is exchanged with the warm pressurised air prior to the pressurised air being expanded by the expansion turbine, the method including providing a heat load being hot cabin air to the heat exchanger.

5. A method of operating an air conditioning system in an aircraft of the kind in which cabin air is recirculated and mixed with cold air from an air conditioning machine which includes at least an expansion turbine over which warm pressurised air is expanded and cooled, and wherein the system includes a heat exchanger in which a heat load is exchanged with the warm pressurised air prior to the pressurised air being expanded by the expansion turbine, the method including providing a heat load from a hot avionics system to the heat exchanger.

6. A method of operating an air conditioning system in an aircraft of the kind in which cabin air is recirculated and mixed with cold air from an air conditioning machine which includes at least an expansion turbine over which warm pressurised air is expanded and cooled, and wherein the system includes a heat exchanger in which a heat load is exchanged with the warm pressurised air prior to the pressurised air being expanded by the expansion turbine, the method including in a first mode of operation, providing a heat load being hot cabin air to the heat exchanger, and in a second mode of operation providing a heat load from a hot avionics system to the heat exchanger.

7. A method according to claim 6 wherein the first mode of operation of the method is performed when the cabin air is hotter than a predetermined temperature range, and the second mode of operation of the method is performed when the cabin air is at or below the predetermined temperature range.

8. A method according to claim 6 wherein the first and second modes of operation of the method are performed concurrently during a transition phase as the cabin air temperature is above the predetermined temperature range and the avionics system is hotter than another predetermined temperature range.

9. An air conditioning system for an aircraft in which there is an air conditioning machine for supplying cold air to a cooling circuit which includes a heat load from a hot avionics system, the air conditioning machine including at least an expansion turbine over which warm pressurised air is expanded and cooled, and wherein the cooling circuit includes a heat exchanger in which heat from the heat load is exchanged with the warm pressurised air prior to the pressurised air being expanded by the expansion turbine.

10. An air conditioning system according to claim 9 which includes an unpressurised aircraft cabin, air from the cooling circuit after warming the warm pressurised air in the heat exchanger, being vented from the cooling circuit.

* * * * *